(No Model.) 2 Sheets—Sheet 2.
C. ANDERSON.
DRAFT DEVICE.
No. 540,891. Patented June 11, 1895.
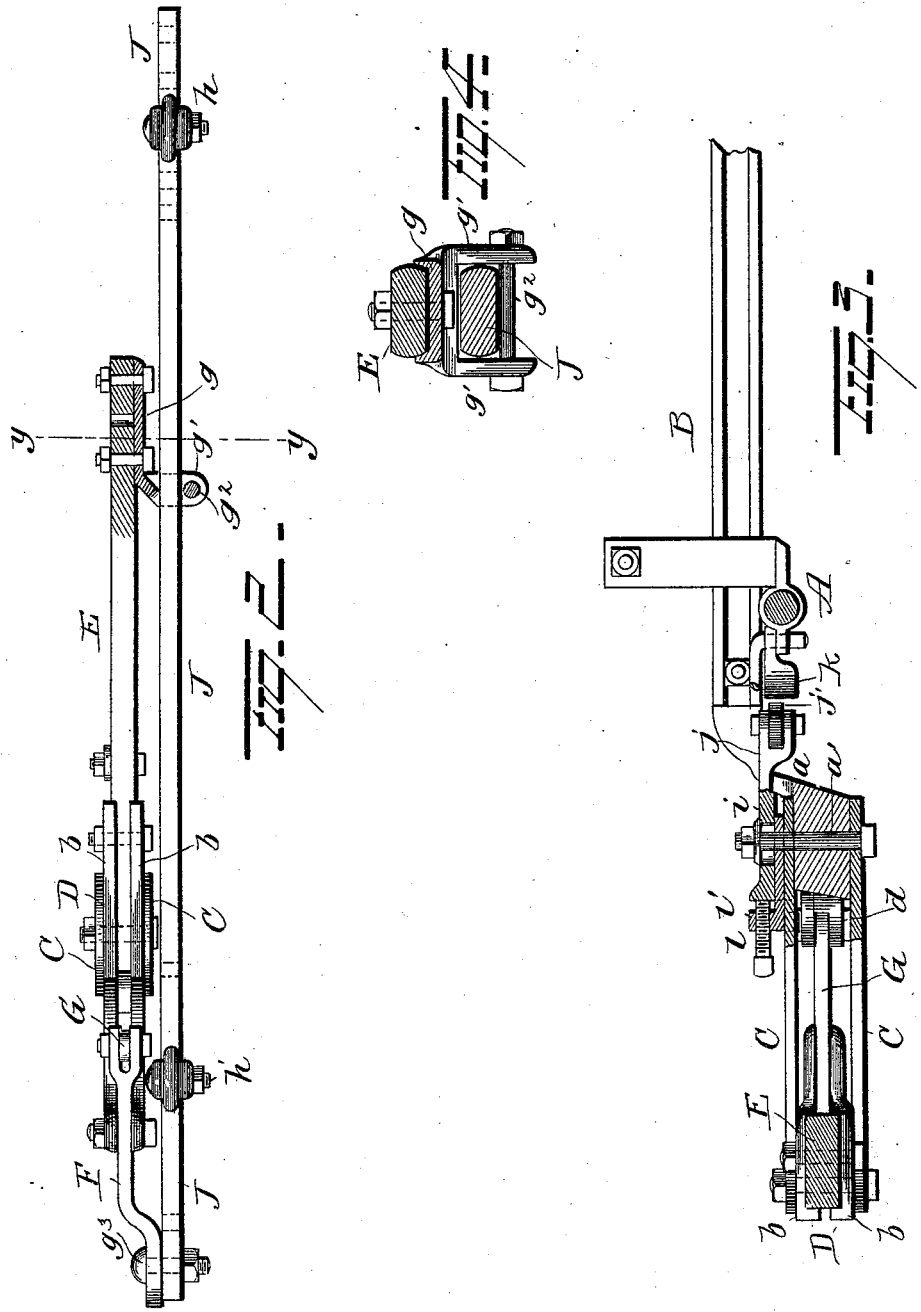
Witnesses
E. J. Nottingham
G. F. Downing.
Inventor
C. Anderson
By H. A. Seymour
Attorney

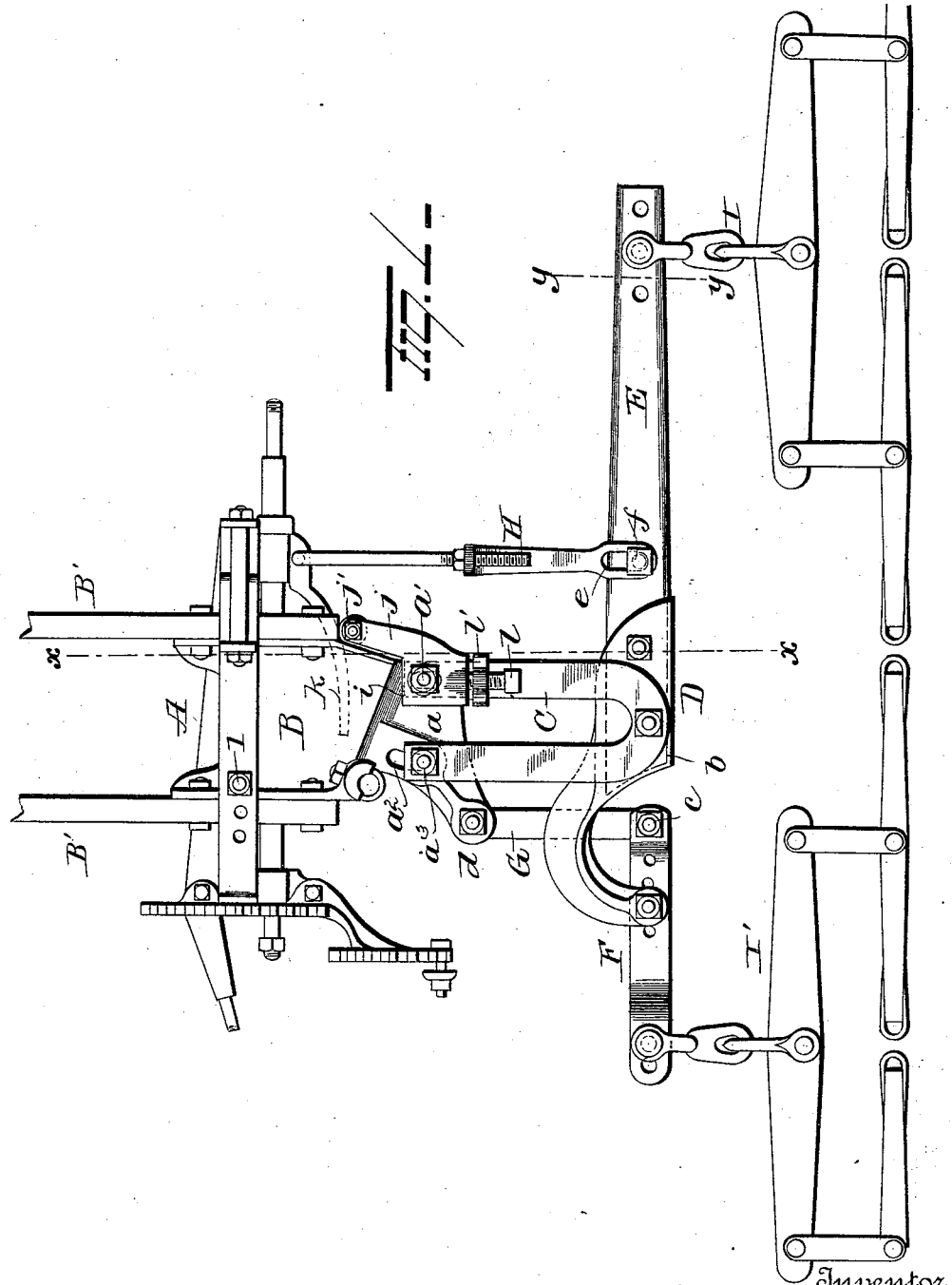

United States Patent Office.

CHARLES ANDERSON, OF SOUTH BEND, INDIANA, ASSIGNOR TO THE SOUTH BEND IRON WORKS, OF SAME PLACE.

DRAFT DEVICE.

SPECIFICATION forming part of Letters Patent No. 540,891, dated June 11, 1895.

Application filed March 9, 1895. Serial No. 541,154. (No model.)

*To all whom it may concern:*

Be it known that I, CHARLES ANDERSON, a resident of South Bend, in the county of St. Joseph and State of Indiana, have invented certain new and useful Improvements in Draft Devices; and I do hereby declare the following to be a full, clear, and exact description of the invention, such as will enable others skilled in the art to which it appertains to make and use the same.

My invention relates to an improvement in draft devices for plows, reapers, mowers, &c., and more particularly to an improvement in the form of draft device disclosed in Letters Patent No. 476,355, granted to me June 7, 1892.

The fault with so called draft eveners or equalizers as heretofore constructed has been that the draft was not evenly divided, one horse or one pair of horses being required to do more work than the others. With four horses hitched to a plow it seems necessary for one horse to walk in the furrow and three horses on the land and it has heretofore been impossible to so equalize the draft that the furrow horse would not pull more than the others, and besides, the furrow horse was badly crowded and worked at a great disadvantage. It is the object of my present invention to overcome these faults and provide means whereby to give the furrow horse more room in which to work and equalize to a nicety the draft of the furrow horse with that of the others.

A further object is to produce a four horse equalizer which shall be accurate in operation, and which can be readily converted into a five horse equalizer by the addition of a single bar.

A further object is to so construct and arrange draft devices for a sulky plow that the truck will be held steady and be prevented from being thrown around on account of the pressure on the plows during the operation of the machine.

A further object is to produce draft equalizing devices which shall be simple in construction, cheap to manufacture and which shall be effectual, in all respects, in the performance of their functions.

With these objects in view the invention consists in certain novel features of construction and combinations and arrangements of parts, as hereinafter set forth, and pointed out in the claims.

In the accompanying drawings, Figure 1 is a plan view illustrating my improvements adapted for four horses. Fig. 2 is a view in front elevation, a portion being in section, showing means for attaching five horses to the draft-equalizing devices. Fig. 3 is a section on the line $x\,x$ of Fig. 1. Fig. 4 is a section on the line $y\,y$ of Fig. 2.

A represents the truck of a sulky or gang plow and is pivotally connected at one side of its center by means of bolt 1 with a plate or bracket B secured between the beams B' B' of the plow. The plate or bracket B is made with a downwardly and forwardly projecting arm $a$, to one side of which one arm of two parallel U-shaped plates C is pivotally connected by a bolt $a'$. The other side of the arm $a$ is made with an elongated slot $a^2$ for the reception of a bolt $a^3$, which connects the other arms of the U-shaped plates with the arm $a$, so that the U-shaped plates can have a limited pivotal movement on the bolt $a'$. Between the forward ends of the U-shaped plates C, a lever D is pivotally connected between its ends, one end of said lever being curved or hook-shaped and made to mark nearly a semi-circle. The lever D is composed of two parallel plates $b\,b$, between the straight portions of which the long wooden bar E of a four horse draft equalizer is secured and projects laterally therefrom.

Between the plates $b\,b$ composing the lever D, at the extremity of the hooked or curved end thereof, a lever F is pivotally connected. This lever may be made of wood but I prefer to make it of metal and it constitutes the short bar of the equalizer. One end of the lever projects within the space formed by the hooked or curved end of the lever D and is bifurcated for the reception of one end of a bar or pitman G, which is pivotally connected thereto by means of a pin $c$. From its connection with the lever F, the bar or pitman G extends rearwardly, passes between the curved portions of the plates $b,\,b$, composing the lever D and at its rear end is pivotally connected to a lug $d$ projecting from the arm $a$ of bracket B.

An adjustable rod H is pivotally connected at one end to the truck A and at the other end is made with an elongated slot $e$ for the reception of a bolt $f$ passing through the long bar E. Whiffletrees, I, for the accommodation of two horses are attached to the free end of the long bar E and similar whiffletrees I' are connected with the free end of the lever or short bar F.

From the construction and arrangement of parts above described it will be seen that the bar or pitman G acts as a fulcrum for overcoming the extreme leverage of the long evener bar E to which the horses which walk on the land are attached. The action of the short bar or lever F is to so equalize the draft that a weak horse or team will be protected from overdraft.

My improvements are adaptable for the attachment of five horses when desired, without in the least affecting the efficiency of the devices to accurately balance or even the draft. When five horses are to be attached, I secure to the under side of the bar E at the free end thereof, a plate $g$ having perforated ears $g'$ for the reception of a cross pin or bolt $g^2$. A long bar J is then passed between the ears $g'$ and permitted to rest on the cross bolt $g^2$. One end of the long bar J is connected by means of a pin $g^3$ with the free end of the short bar or lever F and is of sufficient length to project some distance beyond the free end of the long bar E. Thus the bar J is pivoted at one end to the bar or lever F and has a loose or sliding connection with the bar E so as to permit quick adjustment as the motions of the horses may dictate either in going straight or turning. Hitching devices $h$ for the accommodation of two horses will be attached at or near the free end of the bar J and hitching devices $h'$ for the accommodation of three horses will be connected to said bar J at a point between the joint formed by the connection of the pitman G with the bar or lever F and the end of the hooked or curved portion of the lever D.

My improvements overcome the defects heretofore encountered with draft equalizers; provide for giving the furrow horse a proper amount of room in which to work and equalizes to a nicety the draft of the furrow horse with that of the others.

The combination and arrangement of parts above described results in the production of a draft equalizer which shall be as nearly a perfect balance as can be had, and it is apparent that my improvements are equally adapted to a plow, reaper, mower or other machine.

It has been found that in sulky plows the pressure against the mold boards of the plow is so great that the tendency during the travel of the machine, is to throw the truck around. To avoid this and to hold the truck steady during the operation of plowing I provide devices which co-operate with the draft devices and which will now be described.

On the pivoted arm of one of the U-shaped plates C an adjustable plate $i$ is located and provided with an arm $j$ having a roller $j'$ mounted in its free end, which roller is adapted to bear against and run on a curved arm $k$ secured to the truck. The plate $i$ is made with an elongated slot $i'$ for the accommodation of the bolt $a'$ and said plate and the arm projecting therefrom will be retained in the position in which it is set or adjusted by means of a screw $l$ which passes through a lug $l'$ secured to the U-shaped plate and bears at its end on the end of the plate $i$. These devices will operate to effectually prevent the truck from swinging around and keep the plow steady and uniform at its work. By adjusting the plate $i$ on the U-shaped plate, the angle of the latter relatively to the longitudinal axis of the machine can be changed so as to cause the plow to cut a furrow of greater or less width.

Having fully described my invention, what I claim as new, and desire to secure by Letters Patent, is—

1. The combination with a fixed support, and a support pivoted thereto, of two levers pivotally connected together and one of which is pivotally connected with the pivotal support, and a rod or pitman extending from one of these levers to the fixed support, substantially as set forth.

2. The combination with a fixed support, and a support connected thereto at two points, pivotally at one point and having a limited sliding connection at the other, of two levers pivotally connected together and one pivotally connected to the pivoted support, and means for connecting the other lever pivotally to the fixed support, substantially as set forth.

3. The combination with a fixed bracket, and a swinging truck, of a pair of levers pivotally connected to each other and to the support, and rod extending from one lever to the fixed support and from the other lever to the truck, substantially as set forth.

4. The combination with a fixed support, and a swinging truck, of two levers pivotally connected together and to the support, a rod extending from one lever to the fixed support, and an extensible rod extending from the other lever to the truck, substantially as set forth.

5. The combination with a fixed support, of two levers pivotally connected together and to the support, and a bar J pivotally connected with one lever and having sliding connection with the other, substantially as set forth.

6. In a plow, the combination with a fixed support and a truck pivotally connected thereto, of a draft attachment, and an arm connected to one of said parts and having sliding contact against the other whereby to prevent the trucks from being thrown around during the operation of plowing, substantially as set forth.

7. The combination with a fixed support and a truck connected thereto, of a plate pivoted to the fixed support, draft devices connected with said plate, an arm on the plate and an arm on the truck to be engaged by the arm on the plate, substantially as set forth.

8. The combination with a fixed support and a truck connected therewith, of a plate pivoted to the fixed support, draft devices connected with said plate, an arm on the truck, an arm on the pivoted plate to engage the arm on the truck and means for adjusting the arm on the plate, substantially as set forth.

9. The combination with a fixed support and a truck, of a plate pivoted to the fixed support, draft devices connected with said plate, an arm on the truck, an adjustable arm on the plate, a roller carried by the latter arm adapted to engage the arm on the truck, and a set screw for retaining the arm on the plate at the desired adjustment, substantially as set forth.

In testimony whereof I have signed this specification in the presence of two subscribing witnesses.

CHARLES ANDERSON.

Witnesses:
MICHAEL MATTHEWS,
JNO. W. HARBON.